US011319083B2

(12) United States Patent
Geliot et al.

(10) Patent No.: US 11,319,083 B2
(45) Date of Patent: May 3, 2022

(54) AIRCRAFT NACELLE COMPRISING A COWL WITH TWO ARTICULATED DOORS

(71) Applicant: Airbus Operations SAS, Toulouse (FR)

(72) Inventors: Jean Geliot, Toulouse (FR); Christophe Labarthe, Buzet sur Tarn (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 215 days.

(21) Appl. No.: 16/689,188

(22) Filed: Nov. 20, 2019

(65) Prior Publication Data

US 2020/0164994 A1 May 28, 2020

(30) Foreign Application Priority Data

Nov. 22, 2018 (FR) ...................................... 1871718

(51) Int. Cl.
*B64D 29/06* (2006.01)
*B64D 29/02* (2006.01)
*B64D 29/08* (2006.01)
*B64D 33/02* (2006.01)

(52) U.S. Cl.
CPC ............. *B64D 29/06* (2013.01); *B64D 29/02* (2013.01); *B64D 29/08* (2013.01); *B64D 33/02* (2013.01)

(58) Field of Classification Search
CPC ........ B64D 29/02; B64D 29/06; B64D 29/08; B64D 33/02
USPC ......................................................... 244/54
See application file for complete search history.

(56) References Cited

U.S. PATENT DOCUMENTS

| 2,564,530 | A | | 8/1951 | Guery | |
|---|---|---|---|---|---|
| 4,549,708 | A | * | 10/1985 | Norris | B64D 29/06 244/129.4 |
| 4,629,146 | A | * | 12/1986 | Lymons | B64D 29/08 180/69.2 |
| 5,941,061 | A | * | 8/1999 | Sherry | B64D 29/08 60/798 |
| 9,873,504 | B2 | * | 1/2018 | Aten | F01D 25/24 |
| 2004/0227033 | A1 | | 11/2004 | Picard et al. | |

(Continued)

FOREIGN PATENT DOCUMENTS

| CA | 2893341 A1 | 12/2015 |
|---|---|---|
| EP | 2862805 A1 | 4/2015 |

OTHER PUBLICATIONS

French Search Report; priority document.

*Primary Examiner* — Brady W Frazier
(74) *Attorney, Agent, or Firm* — Greer, Burns & Crain, Ltd.

(57) ABSTRACT

An aircraft nacelle which comprises a structure, an upstream cowl, an upper cowl arranged to the rear of the upstream cowl and having a starboard-side door and a port-side door, each being articulated between a closed position and an open position, each having a front edge, a rear edge, an inner edge and an outer edge. The nacelle comprises, for each door, an articulation and a locking system. Each door is articulated at the level of its outer edge and, in the closed position, the inner edge of one door is contiguous with the inner edge of the other door. Such a nacelle makes the technicians' work easier because the two articulated doors can be opened wide and give easy access under the cowl.

4 Claims, 2 Drawing Sheets

(56) References Cited

U.S. PATENT DOCUMENTS

| | | | | |
|---|---|---|---|---|
| 2007/0267539 A1* | 11/2007 | Bulin | ................... | B64D 29/06 |
| | | | | 244/53 R |
| 2007/0278345 A1* | 12/2007 | Oberle | ................... | B64D 29/08 |
| | | | | 244/53 R |
| 2011/0297787 A1* | 12/2011 | Guillaume | ............. | B64D 29/06 |
| | | | | 244/129.4 |
| 2013/0259641 A1* | 10/2013 | Stewart | ................... | F01D 25/24 |
| | | | | 415/1 |
| 2014/0030079 A1* | 1/2014 | Provost | ................. | B64D 29/06 |
| | | | | 415/201 |
| 2015/0110613 A1 | 4/2015 | Aten | | |
| 2016/0340024 A1* | 11/2016 | Pautis | ................... | B64D 29/08 |
| 2018/0362174 A1* | 12/2018 | Paolini | ................... | B64D 27/16 |

\* cited by examiner

AIRCRAFT NACELLE COMPRISING A COWL WITH TWO ARTICULATED DOORS

CROSS-REFERENCES TO RELATED APPLICATIONS

This application claims the benefit of the French patent application No. 1871718 filed on Nov. 22, 2018, the entire disclosures of which are incorporated herein by way of reference.

FIELD OF THE INVENTION

The present invention relates to an aircraft nacelle comprising a cowl with two articulated doors, and to an aircraft comprising such a nacelle.

BACKGROUND OF THE INVENTION

An aircraft conventionally comprises a fuselage on either side of which is fixed a wing. Each wing supports at least one pylon which in turn supports a nacelle and an engine forming a turbomachine. The nacelle forms the aerodynamic surface which surrounds the engine.

The pylon is fixed between the structure of the wing and the nacelle.

Numerous systems, for example electrical and hydraulic systems, are arranged at the junction where the pylon meets the nacelle. These systems are concealed by aerodynamic cowls, such as, for example, some of those that make up the nacelle.

In particular, a cowl situated in the upper part of the nacelle can be removed in order to access the abovementioned systems and, in particular, to access the electrical connections between the pylon and the engine.

At the present time, such a cowl is attached by a number of fixing screws and, during maintenance operations, removing and refitting the cowl are lengthy operations.

SUMMARY OF THE INVENTION

It is one object of the present invention to propose a nacelle which comprises a cowl having two articulated doors which facilitate access to the systems located at the junction between the pylon and the engine.

To this end, the invention proposes a nacelle of an aircraft, the nacelle having an air intake and comprising:
  a structure,
  an upstream cowl fixed to the structure in order to create an aerodynamic surface and extending rearward from the air intake,
  an upper cowl arranged in the upper part of the nacelle and to the rear of the upstream cowl and having a starboard-side door and a port-side door, each door being articulated between a closed position in which the door is aerodynamically continuous with the other cowls and an open position in which the door uncovers an opening in the nacelle, each door having a front edge arranged at the front of the door, a rear edge arranged at the rear of the door, an inner edge which, in the closed position, is contiguous with the inner edge of the other door, and an outer edge arranged on the opposite side of the door to the inner edge,
  for each door, an articulation arranged at the level of the outer edge and fixed between the door and the structure, the articulation allowing the door to move from the open position to the closed position and vice versa, and
  for each door, a locking system distributed between the front edge and the rear edge and able to move between a locked position in which it blocks the movement of the door with respect to the structure and an unlocked position in which it allows the door to move with respect to the structure.

Such a nacelle makes the technicians' work easier because the two articulated doors can be opened wide and give easy access under the cowl. Furthermore, such doors are more lightweight than a one-piece cowl.

Advantageously, each articulation takes the form of two gooseneck hinges, each one being fixed between the structure and the door.

Advantageously, the nacelle comprises a hinge at the level of the front edge and a hinge at the level of the rear edge.

Advantageously, each locking system comprises, on the structure and in the vicinity of the front edge and of the rear edge, a locking bolt that can be actuated and can move horizontally and, for each locking bolt, a strike secured to the door and which the locking bolt enters in the locked position and leaves in the unlocked position.

The invention also proposes an aircraft comprising a pylon and a nacelle according to one of the above variants attached to the pylon.

BRIEF DESCRIPTION OF THE DRAWINGS

The abovementioned features of the invention, together with others, will become more clearly apparent from reading the following description of one exemplary embodiment, the description being given with reference to the attached drawings, among which.

DETAILED DESCRIPTION OF THE PREFERRED EMBODIMENTS

Figure 1:
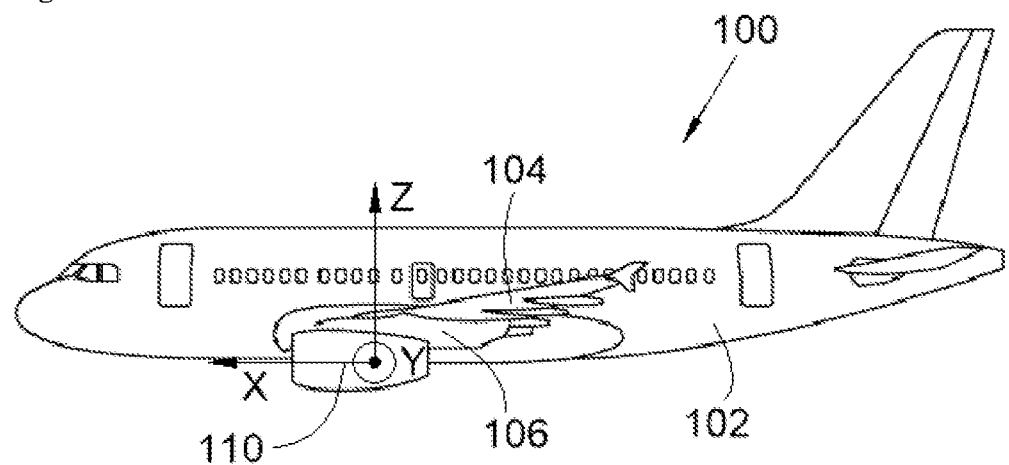
FIG. 1 is a side view of an aircraft according to the invention.

In the description which follows, terms relating to a position are considered with reference to a nacelle mounted on an aircraft moving forward, that is to say, as depicted in FIG. 1.

FIG. 1 shows an aircraft 100 which comprises a fuselage 102 on either side of which is fixed a wing 104. Beneath each wing 104 is fixed a pylon 106 to which is attached a nacelle 110 and an engine (not depicted) surrounded by the nacelle 110.

In the description which follows, and by convention, the longitudinal axis of the nacelle 110, which is oriented positively in the direction of forward travel of the aircraft 100 and which is also parallel to the longitudinal axis of the aircraft 100, is referred to as X, the transverse axis of the nacelle 110 which is horizontal when the aircraft 100 is on the ground is referred to as Y, and the vertical axis or the height that is vertical when the aircraft 100 is on the ground is referred to as Z, these three directions X, Y and Z being mutually orthogonal and forming an orthonormal frame of reference.

Figure 2:
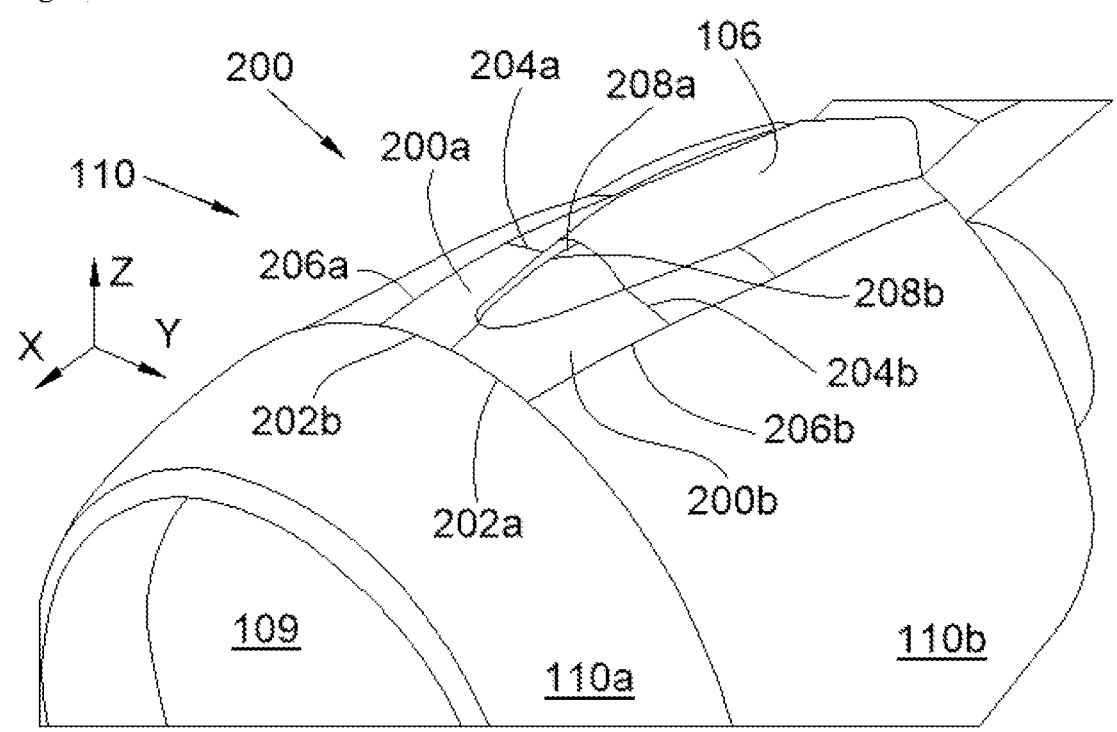
FIG. 2 is a perspective view of a nacelle according to the invention.

FIG. 2 shows the junction between the nacelle 110 and the pylon 106. The nacelle 110 comprises a structure (302, FIG. 3) and several cowls (or fairings) 110a-b, 200 which are fixed to the structure 302 in order to create an aerodynamic surface. In the known way, the nacelle 110 comprises an air intake 109 via which the engine ingests the air it needs for operation. The nacelle 110, in particular, comprises, in the upper part and in front of the pylon 106 (which means to say between the air intake 109 and the pylon 106), an upper cowl 200 with two articulated doors.

The upper cowl 200 is positioned to the rear of an upstream cowl 110a which itself extends rearward from the air intake 109. The upper cowl 200 is positioned between lateral cowls 110b.

Figure 3:
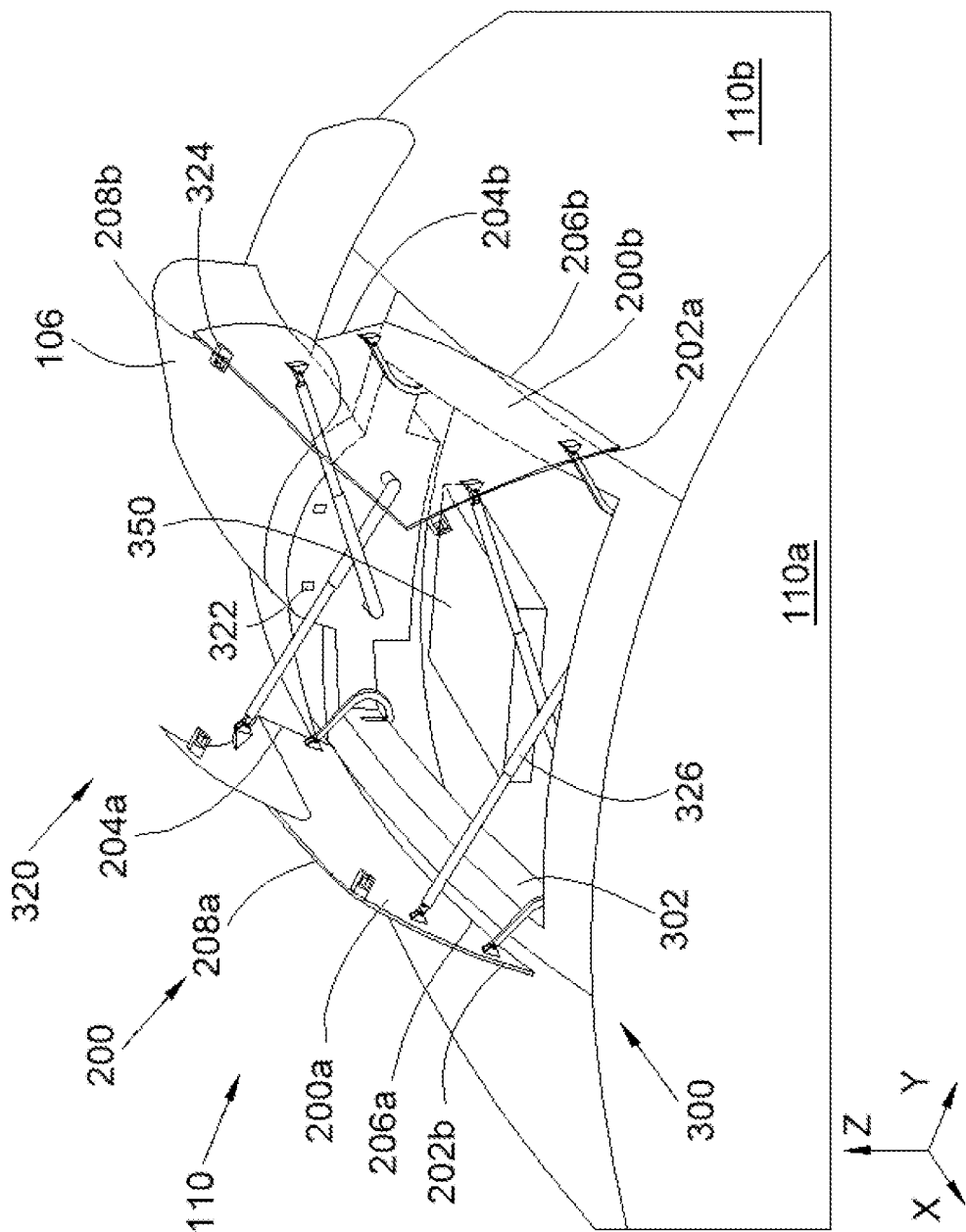
FIG. 3 is a perspective view of part of the nacelle of FIG. 2 with a cowl that has two articulated doors according to the invention, in the open position.

The upper cowl 200 comprises two doors 200a-b, namely a starboard-side door 200a and a port-side door 200b. The two doors 200a-b are contiguous with one another. Each door 200a-b is articulated so that it can pass from a closed position (FIG. 2) to an open position (FIG. 3).

Each door 200a-b comprises four edges 202a-b, 204a-b, 206a-b and 208a-b, which are in opposing pairs.

Each door 200a-b more particularly has a front edge 202a-b which is arranged at the front of the door 200a-b with respect to the longitudinal axis X and which is roughly parallel to the transverse axis Y.

Each door 200a-b more particularly has a rear edge 204a-b which is arranged at the rear of the door 200a-b with respect to the longitudinal axis X and which is also roughly parallel to the transverse axis Y.

Each door 200a-b more particularly has an inner edge 208a-b which, in the closed position, is contiguous with the inner edge 208b-a of the other door 200b-a.

Each door 200a-b more particularly has an outer edge 206a-b which is arranged on the opposite side of the door 200a-b to the inner edge 208a-b.

The outer edge 206a of the starboard-side door 200a is arranged on the starboard side of the starboard-side door 200a, and the outer edge 206b of the port-side door 200b is arranged on the port side of the port-side door 200b.

Each inner edge 208a-b and each outer edge 206a-b are roughly parallel to the longitudinal axis X.

FIG. 2 shows the upper cowl 200 in the closed position and FIG. 3 shows the upper cowl 200 in the open position. In FIG. 3, the upper cowl 200 is shown transparent.

Each door 200a-b is mounted articulated on the structure 302 of the nacelle 110 between the closed position (FIG. 2) in which the door 200a-b is aerodynamically continuous with the other cowls 110a-b of the nacelle 110, and the open position (FIG. 3) in which the door 200a-b uncovers an opening in the nacelle 110 so as to provide access to the inside of the nacelle 110 and, in particular, to the systems of the aircraft 100 which extend between the pylon 106 and the engine such as, in particular, an electrical unit 350. Furthermore, each door 200a-b is not as heavy as a one-piece cowl and the elements used for articulating each door 200a-b can be relatively lightweight.

For each door 200a-b, the nacelle 110 comprises an articulation 300 and a locking system 320. The articulation 300 is fixed between the door 200a-b and the structure 302 and is arranged at the level of the outer edge 206a-b. The articulation 300 allows the door 200a-b to move from the open position to the closed position and vice versa. The locking system 320 locks the door 200a-b in the closed position. Each door 200a-b opens centrally by rotating about its outer edge 206a-b.

The locking system 320 is distributed between the front edge 202a-b and the rear edge 204a-b.

Each articulation 300 here takes the form of two gooseneck hinges, each fixed between the structure 302 and the door 200a-b, where one hinge is at the level of the front edge 202a-b and one hinge is at the level of the rear edge 204a-b.

Each locking system 320 is able to move between a locked position in which it blocks the movement of the associated door 200a-b with respect to the structure 302 of the nacelle 110, and an unlocked position in which it allows the associated door 200a-b to move with respect to the structure 302 of the nacelle 110. The locking system 320 is actuated by any suitable means such as, for example, a handle that can be operated from outside the nacelle 110, or such as, for example, an electric control.

The passage of each door 200a-b from the closed position to the open position is achieved by the pivoting of the door 200a-b about the articulation 300 and by the raising of the inner edge 208a-b.

In the invention embodiment depicted here, each locking system 320 comprises, on the structure 302 and in the vicinity of the front edge 202a-b and of the rear edge 204a-b, a locking bolt 322 which can be actuated and can move horizontally on the structure 302.

Each locking system 320 also comprises, for each locking bolt 322, a strike 324 secured to the door 200a-b and which the locking bolt 322 enters in the locked position and leaves in the unlocked position when actuated. In the invention embodiment depicted here, the locking bolt 322 arranged along the rear edge 204a-b retracts rearwards in order to leave the strike 324 and the locking bolt 322 arranged along the front edge 202a-b retracts forwards in order to leave the strike 324.

In the invention embodiment depicted in FIG. 3, for each door 200a-b, the nacelle 110 comprises at least one actuating cylinder 326 (in this instance two). Each actuating cylinder 326 has a first end mounted in articulated fashion on the structure 302 and a second end mounted in articulated fashion on the door 200a-b. The actuating cylinder 326 assists with the opening of the door 200a-b and keeps it in the open position and is, for example, a gas strut.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A nacelle of an aircraft, the nacelle having an air intake and comprising:
a structure,
an upstream cowl fixed to the structure to create an aerodynamic surface and
extending rearward from the air intake,
an upper cowl arranged in an upper part of the nacelle and to the rear of the upstream cowl and having a starboard-side door and a port-side door, each door being articulated between a closed position in which the door is aerodynamically continuous with other cowls and an open position in which the door uncovers an opening in the nacelle, each door having a front edge arranged at the front of the door, a rear edge arranged at the rear of the door, an inner edge which, in the closed position, is contiguous with the inner edge of the other door, and an outer edge arranged on the opposite side of the door to the inner edge, for each door, an articulation arranged at a level of the outer edge and fixed to the door and the structure and spanning a space therebetween, the articulation allowing the door to open centrally by rotating about its outer edge and to move from the open position to the closed position and vice versa, and for each door, a locking system on the structure of the nacelle and distributed between the front edge and the rear edge of the respective door, each locking system comprising a locking bolt that can be actuated and can move horizontally on the structure and, for each locking bolt, a strike secured to the respective door and which the locking bolt enters in a locked position and leaves in an unlocked position, the locking system being able to move between the locked position in which the locking system blocks the movement of the door with respect to the structure and the unlocked position in which it allows the door to move with respect to the structure.

2. The nacelle according to claim 1, wherein each articulation is formed as two gooseneck hinges, each one being fixed to the structure and the respective door and spanning a space therebetween.

3. The nacelle according to claim 2, one of the gooseneck hinges is at a level of a front edge of the respective door and the other gooseneck hinges is at a level of a rear edge of the respective door.

4. The aircraft comprising a pylon and a nacelle according to claim 1, attached to the pylon.

* * * * *